(12) United States Patent
Grand et al.

(10) Patent No.: US 9,912,206 B2
(45) Date of Patent: Mar. 6, 2018

(54) MOTOR WITH DAMPING MEANS

(71) Applicant: Goodrich Actuation Systems SAS, Buc (FR)

(72) Inventors: Serge Grand, Villebon-sur-Yvette (FR); Serge Bloch, Meudon (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 407 days.

(21) Appl. No.: 14/661,749

(22) Filed: Mar. 18, 2015

(65) Prior Publication Data
US 2015/0280504 A1 Oct. 1, 2015

(30) Foreign Application Priority Data
Mar. 28, 2014 (EP) .................................. 14305450

(51) Int. Cl.
*H02K 3/16* (2006.01)
*H02K 1/16* (2006.01)
*H02K 1/27* (2006.01)
*H02K 3/28* (2006.01)
*H02K 11/20* (2016.01)
*H02K 21/00* (2006.01)

(52) U.S. Cl.
CPC ................. *H02K 3/16* (2013.01); *H02K 1/16* (2013.01); *H02K 1/27* (2013.01); *H02K 3/28* (2013.01); *H02K 11/20* (2016.01); *H02K 21/00* (2013.01)

(58) Field of Classification Search
CPC ........................................................ H02K 3/16

USPC ............................................ 310/51, 182, 183
IPC ........................................................ H02K 3/16
See application file for complete search history.

(56) References Cited

U.S. PATENT DOCUMENTS

| 2004/0239202 | A1* | 12/2004 | Dooley | ............... H02K 1/2786 |
| | | | | 310/184 |
| 2005/0062356 | A1* | 3/2005 | Hoppe | ................... H02K 1/146 |
| | | | | 310/183 |
| 2011/0254394 | A1 | 10/2011 | Piaton | |
| 2012/0038302 | A1 | 2/2012 | Casimir | |

FOREIGN PATENT DOCUMENTS

| DE | 3430590 A1 | 2/1986 |
| WO | 2011138377 A2 | 11/2011 |

OTHER PUBLICATIONS

European Search Report for Application No. 14305450.0-1804, dated Sep. 18, 2014, 7 pages.

* cited by examiner

*Primary Examiner* — Thomas Truong
(74) *Attorney, Agent, or Firm* — Cantor Colburn LLP

(57) ABSTRACT

An electrical motor including a stator, said stator comprising a back iron, a plurality of teeth extending therefrom, and windings wound around said teeth; a rotary body comprising permanent magnets positioned between said stator and said rotary body; said rotary body being coaxially rotatable relative to the stator about a central axis; means for rotating said rotary body about said central axis of rotation relative to said stator, and wherein said back iron of said stator further comprises a first loop of electrical resistive wire extending therein.

12 Claims, 3 Drawing Sheets

MOTOR WITH DAMPING MEANS

FOREIGN PRIORITY

This application claims priority to European Patent Application No. 14305450.0 filed Mar. 28, 2014, the entire contents of which is incorporated herein by reference.

TECHNICAL FIELD

Motors comprising mechanisms for damping the movement of moving aerodynamic surfaces moved by the motor are described. The motors comprising the damping mechanisms may be permanent magnet brushless motors.

BACKGROUND

For hydraulic cylinders, a damping effect is obtained by utilizing flow restriction through orifices in the bypass between the chambers. The electro-hydraulic actuator control is enabled by an inherently safe mode valve. When a voltage is applied to the valve no damping effort is generated. When the voltage is released or in case of failure, the valve mode switches to damping mode under operation of a spring making the fluid pass through the restriction.

Known methods of damping of moving aerodynamic surfaces in mechanical or electromechanical devices such as motors or actuators etc. often require the use of additional, and often, complex, electronic circuitry, which can complicate a device.

Damping in mechanical or electromechanical devices having moving aerodynamic surfaces is mandatory to prevent catastrophic flutter oscillations in case of actuator or power supply failure or loss of control. For an electromechanical actuator, this damping effect is provided by generating a reverse torque that is related to the position rate of the actuator.

US 2012/0038302 A1 aims to provide a damping solution that can be used in a motor power supply circuit for powering an electric motor that may be used, for example, for actuating a movable airfoil of an aircraft. In such situations, two electric motors and two power supplies are connected to the airfoil and are used in a redundant scheme such that in the event of one of the motors failing, the other motor can be used as a replacement. The power supply circuit described in this document comprises an active mode, in which it powers the motor, and a passive mode, in which it provides damping by switching the motor phases across a bank of three damping resistors. The design is based on naturally closed power switching devices so that when the power supply circuit is in active mode, no current flows through the damping resistors while, when the power supply is lost, the windings of the motor are connected to the damping resistors.

US 2011/0254394 A1 describes a supplemental damping effect for an electric motor that is described as being analogous to the damping resulting from the use of a hydraulic cylinder, however, in contrast to what is achieved for a hydraulic cylinder, the damping effect is always available in all circumstances, without the intervention of any device. The damping effect described in this document filters out vibrations originating directly from the mechanism maneuvered by the electric motor. The electric motor consists of a rotor fitted with permanent magnets and comprises a stator, the stator being made up of two parts: a stack of laminations forming round teeth and a solid tube-shaped field frame made of a material of the stainless steel kind, enveloping the stack of laminations. The stainless steel constitutes a poor magnetic circuit, with losses through eddy currents and hysteresis. These losses therefore offer braking and damping.

SUMMARY

An electrical motor is described comprising a stator, said stator comprising a back iron, a plurality of teeth extending therefrom, and windings wound around said teeth; a rotary body comprising permanent magnets positioned between said stator and said rotary body; said rotary body being coaxially rotatable relative to the stator about a central axis; and means for rotating said rotary body about said central axis of rotation relative to said stator; and wherein said back iron of said stator further comprises a first loop of electrical resistive wire extending therein.

The motor may further comprise means for opening said first loop of electrical resistive wire.

The means for opening said first loop of electrical resistive wire may be configured to open said loop when said motor is in a motoring mode.

The means for opening said first loop of electrical resistive wire may comprise a switch.

The means for opening said first loop of electrical resistive wire may comprise a normally closed switch; and the motor may further comprise means for applying a gate voltage to said normally closed switch to thereby open said normally closed switch.

The means for applying said gate voltage to open said normally closed switch may be configured to apply said gate voltage when said motor is in a motoring mode.

The means for applying said gate voltage to open said normally closed switch may be configured to not apply said gate voltage when said motor is not in a motoring mode.

The back iron of said stator may be cylindrical and may comprise a first side and an opposing second side with a circumferential surface extending therebetween and said first loop may extend within said back iron between said first and second sides of the back iron.

The loop may further extend in a circumferential direction and may comprise undulations extending between said first and second sides of said back iron as it extends between the first and second sides and in the circumferential direction.

The electrical motor may further comprise a first channel extending between said first side and said second side of the back iron; and may further comprise a second channel extending between said first and said second side of said back iron; and said first loop of electrical resistive wire may extend within and between said first and second channels.

The first channel may extend from a first opening on said first side of said back iron, through said back iron and between said first side and said second side of said back iron and to a second opening on said second side of the back iron. Said second channel may be circumferentially offset from said first channel, said second channel extending from a third opening on said second side of said back iron, through said back iron and between said second side and said first side of said back iron to a fourth opening on said first side of said back iron. The loop of electrical resistive wire may further extend from said first opening on said first side of the back iron, through said first channel and out of said second opening on said second side of said back iron, and said electrical resistive wire may further extend in a circumferential direction from said second opening to said third opening on said second side of said back iron, through said second channel and out of said fourth opening on said first side of said back iron.

The electrical motor may further comprise a plurality of said channels extending between said first side and said second side of the back iron; said plurality of channels may be circumferentially offset relative to each other and said first loop of electrical resistive wire may extend within and between said plurality of channels in a circumferential direction.

The channels through which the electrical resistive wire is looped may be radially equidistant from said central axis of rotation.

In any of the examples described herein, the electrical motor may further comprise a plurality of said loops of electrical resistive wire.

The electrical motor of may further comprise a plurality of means for opening said plurality of loops of electrical resistive wire.

DETAILED DESCRIPTION

Figure 1:
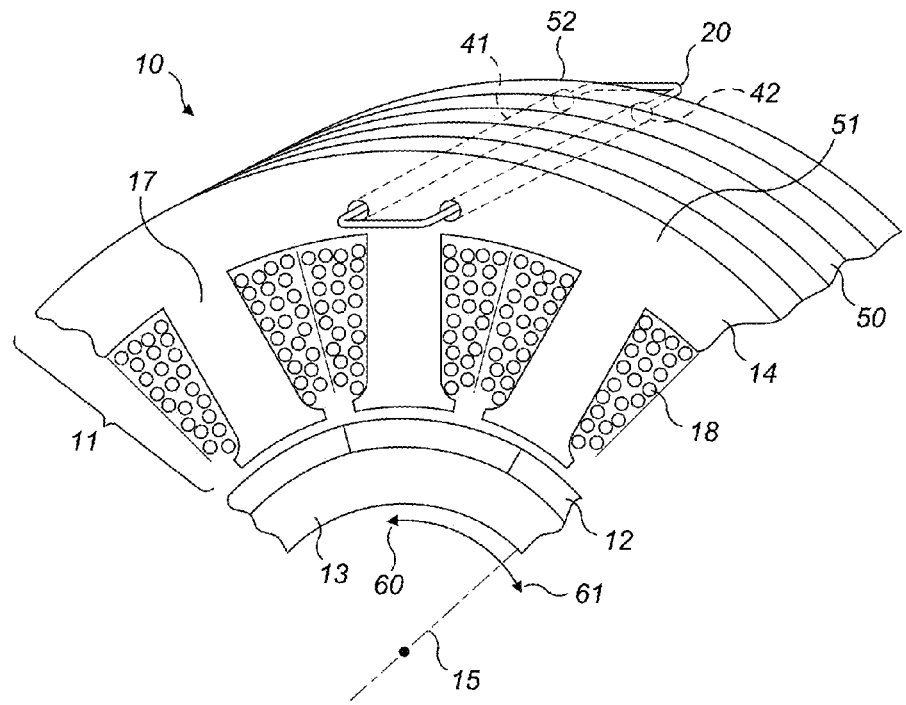
FIG. 1 shows a first example of a motor that has been modified to comprise a new damping mechanism.

Motors comprising a new type of damping means, for damping the motor and the moving aerodynamic surfaces driven by the motor are described herein. The new damping means/mechanisms described herein may be used to generate a damping torque inside a motor, such as a permanent magnet brushless DC or AC motor 10. Examples of a permanent magnet brushless motor 10 having these new types of damping mechanism fitted/integrated therein are depicted in FIGS. 1 to 4.

As is known in the art, a permanent magnet motor may comprise a stator and rotor body. FIGS. 1 to 4 depict a modified standard electrical motor 10 that comprises a cylindrical or ring-shaped rotor body 13 having permanent magnets 12 provided around its outer circumference. The motor 10 further comprises a stator 11 which comprises a back iron 14 and windings 18 provided around teeth 17 of the stator 11. As is also known in the art, the rotor body 13 and the stator 11 are both cylindrical, or ring-shaped, in form and are mounted coaxially relative to an axis 15 of rotation which extends through the centre of both the stator and rotor body 11, 13. A small air gap is provided between the permanent magnets 12 and the stator.

In the examples shown in FIGS. 1 to 4, the ring-shaped rotor body 13 has a smaller outer circumference than the inner circumference of the teeth of the stator, and is therefore positioned within the inner circumference of the ring-shaped stator 11, with the air gap therebetween, as can be seen in the figures. In other known brushless motors, however, which are not shown in the figures, the motor may comprise an external rotor (e.g. a brushless outrunner motor).

In the examples shown in FIGS. 1 to 4, it can be seen that the teeth 17 with windings 18 extend from the back iron 14 and inwards towards the rotor 13 and permanent magnets 12, in the direction of the central axis 15.

Figure 2:
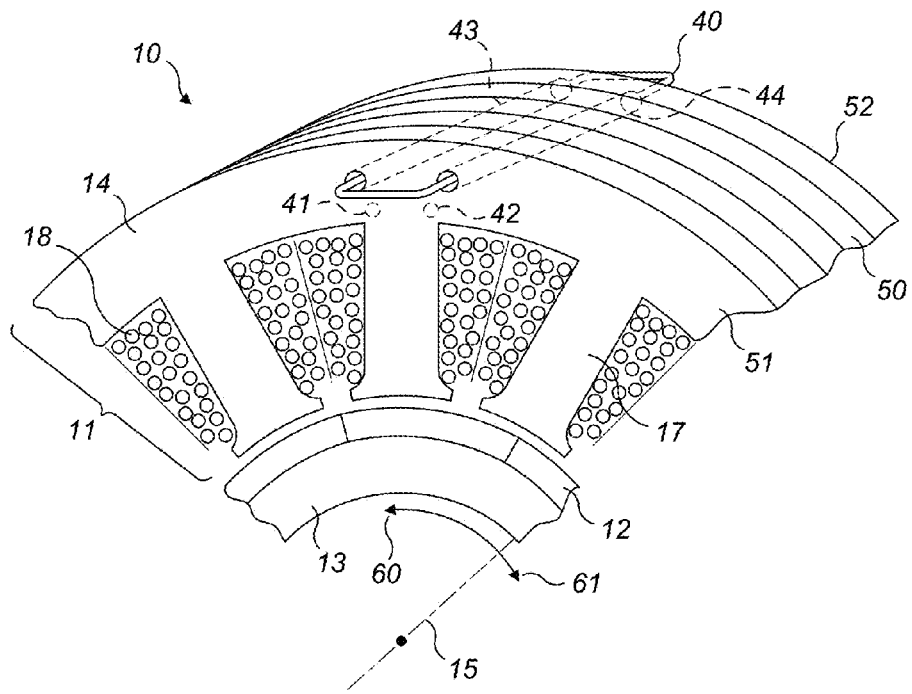
FIG. 2 shows a second example of a motor that has been modified to comprise a new damping mechanism wherein the channels are positioned radially further outward than in the example of FIG. 1 so that less damping torque is produced in comparison to the example of FIG. 1.
Figure 3:
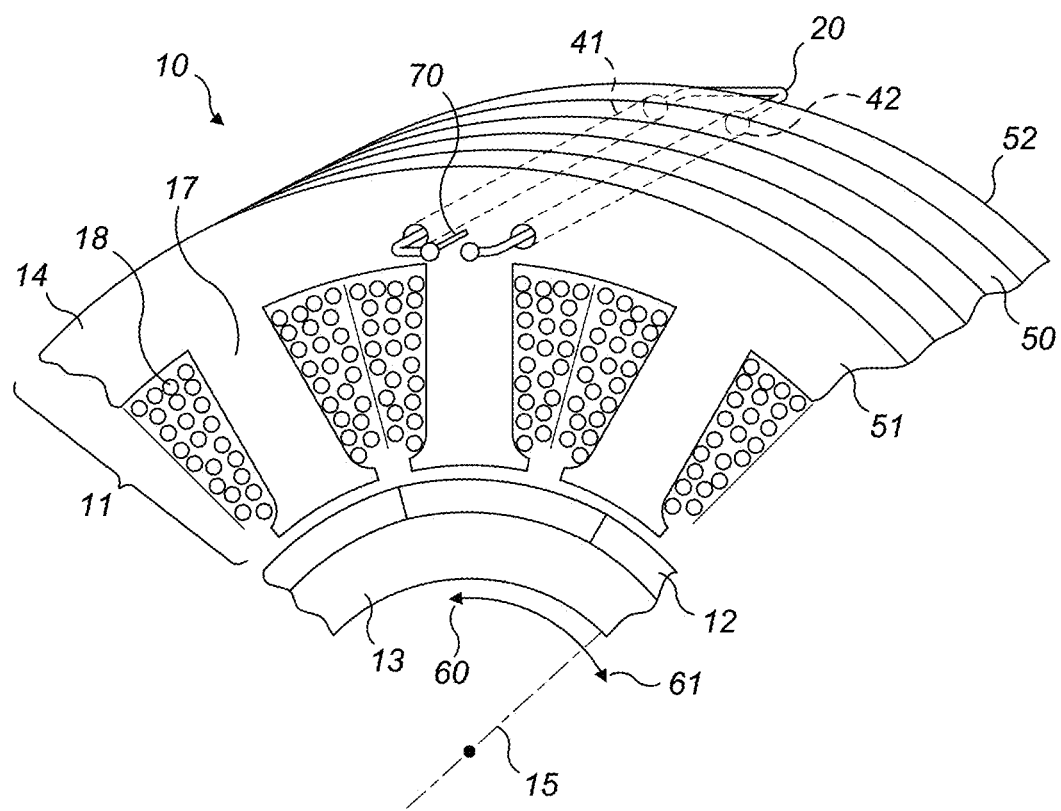
FIG. 3 shows an example of a motor that has been modified to comprise a new damping mechanism that is disengageable.

In the examples shown in FIGS. 1 to 3, the standard motor has been modified to include a plurality of hollow channels 41, 42, 43, 44 provided within the back iron 14 of the stator 11. Various turns of an electrical resistive wire 20, 40 have then been fitted into and threaded through and between at least some of the channels 41, 42, 43, 44 to form a loop (as seen in FIG. 1) or loops (not shown). As described in greater detail below, this looping of a resistive wire 20, 40 through these channels in the back iron 14 may ultimately result in a damping effect on the moving aerodynamic surfaces of the motor.

Figure 4:
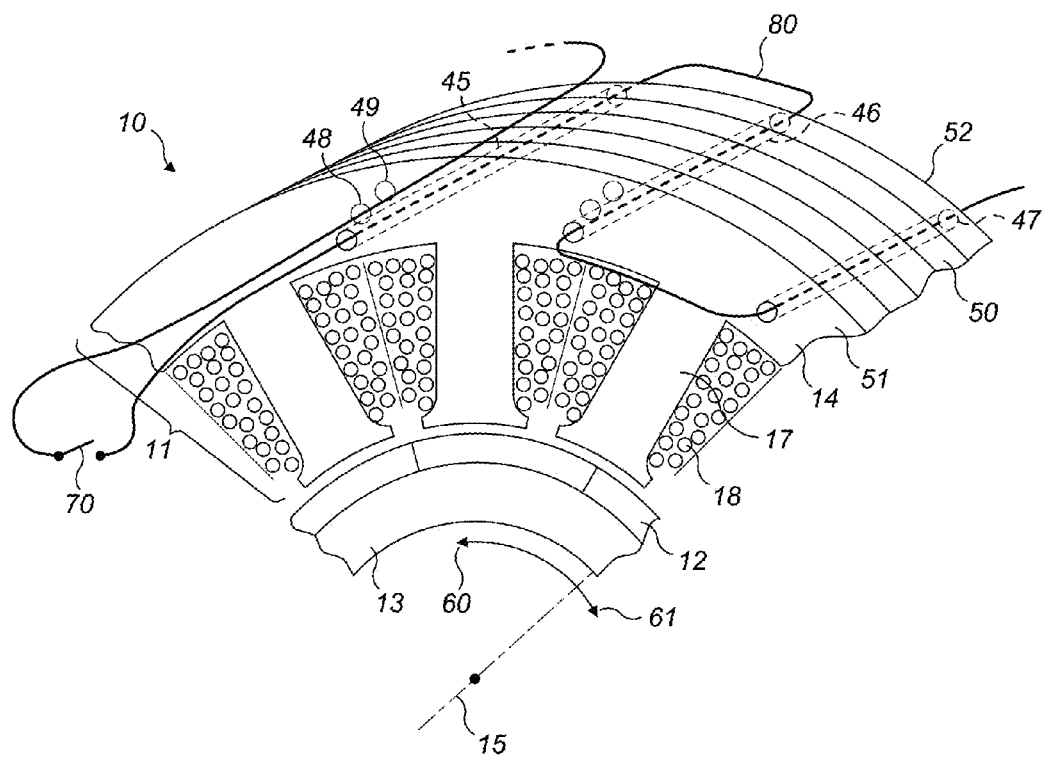
FIG. 4 shows an example of a motor that has been modified to comprise a new disengageable damping mechanism.

In the examples described herein the resistive wire 20, 40, 80 may be looped through the back iron of the stator so that it extends between a first and second side of the stator. In some examples, more than one individual loop of resistive wire 20, 40 may be provided and the loops may be spaced apart from, or offset relative to, each other in the circumferential direction. In such an arrangement, the circumferentially offset loops may or may not be radially equidistant from the central axis, 15 (FIGS. 1 to 3). In other examples, the loop 80 may form a coil which extends between the first 51 and second side 52 of the stator as well as in the circumferential direction, and may extend around the circumference of the back iron to thereby form an undulating pattern around the circumference of the back iron (FIG. 4).

The modified motors will now be described in greater detail. It can be seen in FIGS. 1 to 4 that the cylindrical back iron 14 of the stator comprises a first side 51 and an opposing second side 52 (not seen in the figures), and a cylindrical outer surface 50 extending therebetween and forming the back iron's outer circumference. The sides 51, 52 extend from the cylindrical outer circumferential surface 50 of the back iron, inwards, in a direction towards the central axis 15 of the motor, i.e. in a direction that is generally perpendicular to the central axis of rotation, 15.

In the example shown in FIG. 1, two channels 41, 42 are provided in the back iron 14, each of the channels extending though the back iron of the stator and between a first opening on the first side 51 of the back iron and a second opening on the second, opposite side 52 of the back iron 11. The resistive wire 20 is then threaded through both of these channels in order to form a loop in the back iron 14. The loop therefore extends in both a direction that is generally parallel to the central axis of rotation, (i.e. as it extends within the channels of the back iron and between the first and second sides 51, 52 of the back iron 14), and also extends in the circumferential direction, (i.e. as it extends between the openings of the channels on each side 51, 52 of the back iron).

In further detail, the resistive wire 20 may be threaded through the channels 41, 42 in the back iron 14 so that it extends from an opening on the first side 51, of the back iron, through the first channel 41, (i.e. in a direction that is generally parallel to the central axis 15 of rotation), out of the opening on the second side 52 of the back iron, and from there in the circumferential direction 61 to the opening of the second channel 42 provided on the second side 52 of the back iron, back through the second channel 42 and out of the opening of the second channel 42 that is provided on the first side 51 of the back iron 14. The resistive wire 20 extending from this opening is then connected back to the portion of wire that is threaded into the first opening of the first channel 41, to thereby form a closed loop or circuit, as shown in FIG. 1.

In this example, it can be seen that the first 41 and second 42 channels through which the looped resistive wire extends are positioned in the back iron 14 so as to be adjacent to, and spaced apart from, each other in the circumferential direction and are approximately the same distance radially from the central axis, 15. Other positional variations are possible, e.g. wherein the channels are not equidistant from the central axis of rotation, however, as described later, the effects of the damping effect will alter depending on the radial positioning of the channels and therefore loops contained therein.

In the example shown in FIG. 2, third 43 and fourth 44 channels are provided, similar to those shown in FIG. 1, wherein the third and fourth channels are also positioned adjacent to, and spaced apart from, each other in the circumferential direction and at the same radial distance from the central axis. The third 43 and fourth 44 channels are, in this case, however positioned radially outward from the first 41 and second 42 channels, respectively. A resistive wire 40 may be looped through these third and fourth channels, in the same manner as described above for the first and second channels. In this case, the first and second channels may or may not also contain a loop of resistive wire. This loop of resistive wire extending within and between the third and fourth channels therefore extends through the back iron between the first side 51 and the second side 52 in a position within the back iron that is radially outward in comparison to the loop depicted in FIG. 1.

In the example shown in FIG. 4, a plurality of circumferentially offset channels 45, 46, 47 are again formed in the back iron, 14. In this example, a resistive wire 80 is threaded between the first side 51 of the stator and second side 52 of the stator and through the body of the stator (i.e. in a direction that is generally parallel to the central axis of rotation 15), as it extends in the circumferential direction and from one circumferentially offset channel to the next to thereby form a loop or coil that comprises undulations extending between the first 51 and second 52 sides of the stator whilst also extending in the circumferential direction. In this example, the circumferentially offset channels are also at approximately the same distance radially with respect to the central axis 15. FIG. 4 shows alternative radial positions 48, 49 at which a plurality of these channels may be formed in the back iron of the stator around the circumference of the back iron.

In a normal motoring mode, the motor rotates the rotor body 13 relative to the stator 11 about the central axis 15 and in a direction of rotation 60 or 61, as shown in the figures. Upon rotation of the rotor body 13 (and therefore also rotation of the associated permanent magnets 12) relative to the stator 11 a variable magnetic flux is generated inside the back iron 14. Such electric motors operate through the interaction between the electric motor's magnetic field (created by the permanent magnets 12 provided on the rotor 13), and the magnetic field produced by the currents travelling through the stator windings 18, to thereby generate force within the motor due to the rotating magnetic field that is produced when the windings are properly energized.

Due to the presence of the loop(s) or coil(s) of resistive wire provided in the channels of the back iron of the stator, the resistive wire intercepts the variable flux that is being generated inside the back iron 14 due to the rotation of the magnets 12 fitted on the rotor 13. When the loop of resistive wire is a closed loop, or when it is short-circuited via a switch (as described later) the magnetic field sweeps across it and a voltage is induced. This voltage therefore produces a current flowing in the resistive wire which in turn then generates a reverse torque that is related to the rotational speed. This therefore provides a damping effect.

For a given rotational speed, the generated torque can be adjusted in different ways. For example, the flux linkage, i.e. the level of coupling between the flux and the looped wire, can be adjusted, thereby enabling to trim the value of the generated torque. This can be achieved by looping the resistive wire through sets of channels (e.g. through first and second channels as described above, or through a plurality of channels) that are radially closer or further away from the central axis of rotation, as described above. For loops that are provided radially further away from the central axis 15, there is less coupling between the flux and the wire and so less torque and therefore less damping is produced. The example shown in FIG. 1 would therefore produce a greater torque and so a greater damping effect than the example shown in FIG. 2. For the example shown in FIG. 4, the amount of torque can also be changed/controlled by looping the wire through channels that are radially closer or further away from the central axis of rotation, 15.

Changing the arrangement of wires inside the channels can also serve to adjust the reverse torque generated at a given rotational speed. For example, the damping mechanism of examples 1 and 2 can be replicated about the circumference of the back iron, by providing a plurality of sets of first and second channels each containing an individual loop such as those shown in FIGS. 1 and 2; the plurality of sets of first and second channels being spaced around the circumference of the back iron (i.e. circumferentially offset from each other). These sets of individual loops may or may not be positioned equidistant from the central axis, the radial distance dictating the correct amount of torque produced. Alternatively, or additionally, an undulating loop(s) or coil(s) may be used, such as is described above with reference to FIG. 4.

Another way to adjust the torque and therefore damping effect is by tuning the current flowing in the loops. For example, the resistance of the wire may be modified. A more resistive wire will reduce the current generated at a given speed thus decreasing the torque applied to the rotor. Conversely a less resistive wire will increase the torque generated.

To some extent, the amount of torque generated by these damping assemblies and methods is related to the rotation speed and the damping torque is produced in the opposite direction causing a damping effect. For example, at lower speeds, the current flowing in the coil would increase as the speed of rotation is increased.

In the examples described herein, damping is therefore provided due to physical laws, as opposed to by electronics.

In some examples described herein, the damping torque may also be disengageable, with very limited electronics being used to disengage the damping means and reduce the damping effect.

This disengaging means 70 may comprise means for opening the loop (or loops) of electrical resistive wire and thereby cancel the damping effect. The means for opening the loop (or loops) of electrical resistive wire may further be configured to open the loop (or loops) when the motor is in a motoring mode. In such examples, the damping torque can therefore be cancelled completely when the motor is driving the load in motoring mode in order to optimize the global efficiency and decrease the thermal losses. This may be achieved by a switch 70 (or in the case of multiple loops, multiple switches), for example an on/off switch. This on/off switch may be an electronic device for electric commutation.

In some examples, the switch 70 may be a normally closed switch. In some examples, the normally closed switch may be a so-called "normally ON" component, as is known in the art. Examples of this include a SiC JFET. In such examples the motor may further comprise means for applying a gate voltage to the normally closed switch to thereby open the normally closed switch.

Figure 5:
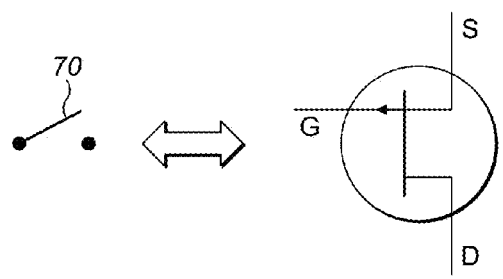
FIG. 5 shows an example of a switch that may be used in conjunction with the damping mechanisms shown in FIGS. 1 to 4.

During driving of the motor, the gate voltage may therefore be applied to open the switch component 70 (see FIGS. 3, 4 and 5). With such switches, when the gate voltage is applied and the switch is open, no current flows in the loops and so no damping effect is produced. When the gate voltage is removed, (either actively or due to a power or control failure), the normally closed switch would close the loop, to thereby create the damping effect described above. Conversely, when power is restored and the gate voltage is reapplied to the switch, the loop would again be opened, which would then reduce, or cancel the damping effect. In some examples the means for supplying the gate voltage to open the normally closed switch may therefore be configured to apply the gate voltage when the motor is in a motoring mode. In some examples, it may be configured to apply the gate voltage when the motor is in motoring mode and not when the motor is not in motoring mode.

Such examples have the effect of being able to avoid the thermal waste and loss of efficiency that would be created if the reverse torque was being produced when the motor is driving the load in motoring mode. These examples also guarantee that the damping torque is generated even in case of power failure, as the switching component behaves like a short-circuit when it is de-energized. This improves the safety of the mechanism.

This switch feature 70 may be used in combination with any of the examples described herein to make the damping effect disengageable. In the examples described herein, the design is therefore based on a naturally closed power switching device so that if the control or the power is lost, the loops are shorted and damping is applied but otherwise, during normal operation, the damping is cancelled. FIGS. 3 to 4 show examples of this disengageable feature in use. The left hand side of FIG. 5 depicts a switch when open (i.e. the loop is open) and the right hand side of FIG. 5 shows the standard symbol for a p-channel JFET with the Gate terminal (G), Source terminal (S) and Drain terminal (D) that can be used as a naturally closed power switching device.

In some examples, this switching device 70 may be fitted near to the motor. In some examples the switching device may further be fitted with the appropriate lightning and EMI protections to prevent parasitic connections or disconnections.

The global behaviour of the damping mechanisms and assemblies described herein may therefore be described as being similar to the function of the mode valve of an electro-hydraulic actuator.

For example, when the command voltage is applied to the solenoid valve driving the spool of the mode valve of an electro-hydraulic actuator, the mode valve switches to active mode, and no damping effort is generated. With the damping assemblies described in relation to the examples described herein, when the command voltage is applied to the JFET, the coils circuit is opened and so, again, no torque is generated.

When the command voltage is released for an electro-hydraulic actuator, the valve mode switches to damping mode under operation of a spring. With the examples described herein, when the command voltage is released, the electronic switch short-circuits the coils, thereby inducing the damping torque generation.

Fitting damping assemblies such as those described herein inside a motor, or indeed integrating such assemblies into a motor, in order to achieve the damping function, is quite as safe as the damping feature on hydraulic actuators. The examples described herein further avoid oversizing the driving torque of the motor as would be the case if the damping was obtained with a sleeve or any other non-disengageable means.

In addition to this, using a motor with less torque means the motor is lighter and draws less current. This in turn reduces the weight of the power drive electronics and eventually optimizes the weight of the complete actuator.

The invention claimed is:

1. An electrical motor comprising
   a stator, said stator comprising a back iron, a plurality of teeth extending therefrom, and windings wound around said teeth;
   a rotary body comprising permanent magnets positioned between said stator and said rotary body;
   said rotary body being coaxially rotatable relative to the stator about a central axis;
   means for rotating said rotary body about said central axis of rotation relative to said stator,
   wherein said back iron of said stator further comprises a first loop of electrical resistive wire extending therein;
   wherein said back iron of said stator is cylindrical and comprises a first side and an opposing second side with a circumferential surface extending therebetween;
   wherein said first loop extends within said back iron between said first and second sides of the back iron;
   a first channel extending between said first side and said second side of the back iron; and
   a second channel extending between said first and said second side of said back iron;
   wherein said first loop of electrical resistive wire extends within and between said first and second channels;
   said motor further comprising:
   a third channel extending between said first side and said second side; and
   a fourth channel extending between said first side and said second side,
   wherein a second loop of electrical resistive wire extends within and between said third and said fourth channels and wherein said third and said fourth channels are positioned radially outward of the first and second channels.

2. The electrical motor of claim 1 further comprising means for opening said first loop of electrical resistive wire.

3. The electrical motor of claim 2 wherein said means for opening said first loop of electrical resistive wire is configured to open said loop when said motor is in a motoring mode.

4. The electrical motor of claim 3 wherein said means for opening said first loop of electrical resistive wire comprises a switch.

5. The electrical motor of claim 2, wherein said means for opening said first loop of electrical resistive wire comprises a normally closed switch; and
   wherein said motor further comprises means for applying a gate voltage to said normally closed switch to thereby open said normally closed switch.

6. The electrical motor of claim 5 wherein said means for applying said gate voltage to open said normally closed switch is configured to apply said gate voltage when said motor is in a motoring mode.

7. The electrical motor of claim 5 wherein said means for applying said gate voltage to open said normally closed switch is configured to not apply said gate voltage when said motor is not in a motoring mode.

8. The electrical motor of claim 1, wherein said first loop of electrical resistive wire further extends in a circumferential direction and comprises undulations extending between said first and second sides of said back iron as it extends between the first and second sides and in the circumferential direction.

9. The electrical motor of claim 1, wherein said first channel extends from a first opening on said first side of said back iron, through said back iron and between said first side and said second side of said back iron and to a second opening on said second side of the back iron; and wherein said second channel is circumferentially offset from said first channel, said second channel extending from a third opening on said second side of said back iron, through said back iron and between said second side and said first side of said back iron to a fourth opening on said first side of said back iron; and wherein said first loop of electrical resistive wire extends from said first opening on said first side of the back iron, through said first channel and out of said second opening on said second side of said back iron, said electrical resistive wire further extending in a circumferential direction from said second opening to said third opening on said second side of said back iron, through said second channel and out of said fourth opening on said first side of said back iron.

10. The electrical motor of claim 1, further comprising a plurality of said channels extending between said first side and said second side of the back iron; said plurality of channels being circumferentially offset relative to each other and wherein said first loop of electrical resistive wire extends within and between said plurality of channels in a circumferential direction.

11. The electrical motor of claim 1, wherein said channels are radially equidistant from said central axis of rotation.

12. The electrical motor of claim 1 further comprising a plurality of said loops of electrical resistive wire.

\* \* \* \* \*